Dec. 2, 1947.  A. E. WENSLEY  2,431,897
PNEUMATIC TIRE
Filed Feb. 2, 1944
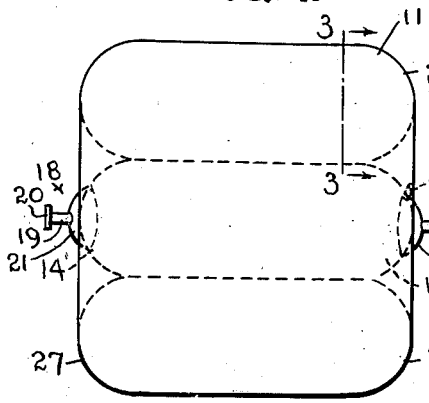
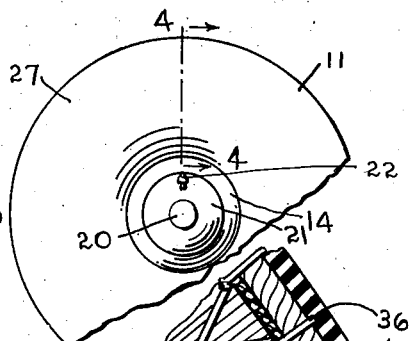
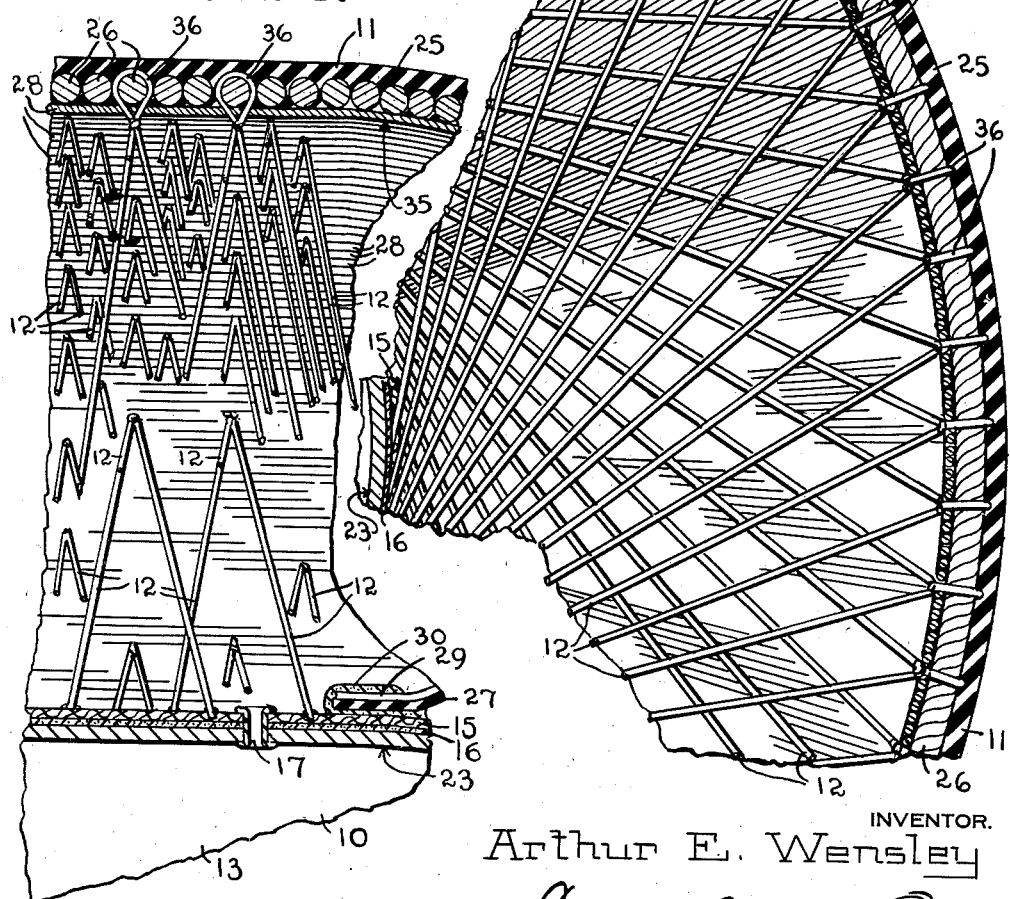
INVENTOR.
Arthur E. Wensley
BY Lancaster, Allwine & Rommel
ATTORNEYS Patented Dec. 2, 1947

2,431,897

UNITED STATES PATENT OFFICE 2,431,897

PNEUMATIC TIRE

Arthur E. Wensley, Schenectady, N. Y.

Application February 2, 1944, Serial No. 520,791

1 Claim. (Cl. 152—330)

This invention relates to resilient pneumatic tires.

An important object of the invention is to provide a resilient tire, adapted to function under low air pressure and to spread over a relatively large ground contact area.

Another important object is to provide a small diameter tire which, however, will adequately support heavy loads and stand up under excessive traction strains, with little internal friction and destructive heating of the tire structure.

Still another object is to provide a resilient tire which may be employed over soft ground without bogging down.

The tire is particularly, but not exclusively, adapted for use with heavy equipment, such as aeroplanes and tractors. Its use allows tractors to move over soft ground with small power loss incident to packing the ground. It permits aeroplanes to move over soft ground with less danger from nosing over and bogging.

Another object is to provide a low-air pressure, broad, pneumatic tire of relatively small diameter and weight, which may be employed as landing wheels, since there is a large ground contact.

Other objects and advantages of the invention will be apparent during the course of the following detailed description of the invention, taken in connection with the accompanying drawing, and in which drawing, Fig. 1 is an end elevation of the new tire.

Fig. 2 is a fragmentary side elevation thereof.

Fig. 3 is a fragmentary section (enlarged) upon substantially the line 3—3 of Fig. 1.

Fig. 4 is a fragmentary section (enlarged) upon substantially the line 4—4 of Fig. 2.

In the drawing, wherein for the purpose of illustration is shown a preferred embodiment of the invention and wherein similar reference characters designate corresponding parts throughout the several views, the novel resilient pneumatic tire includes a central support or rim 10, a casing 11 and a plurality of flexible members 12 within the casing 11 and bridging the support 10 and casing.

The central support or rim 10 is, preferably, a tubular body 13 of suitable rigid material as steel, having end walls 14, which may be outwardly convex.

Carried by the periphery of the tubular body 13 is a suitable fabric covering 15, which may be rubber impregnated and secured to the body 13 in any approved way, as by suitable cement 16. Extending through the wall of the body 13 and fabric covering 15 may be one or more ports 17 for passage of air.

Means 18 for attaching the tire to a suitable portion of a vehicle, such as the conventional struts of an aeroplane, is provided, and may comprise a spindle 19 carried outwardly at each end wall 14 and terminating in an enlarged portion 20. Of course this means 18 may take any approved form. Preferably these spindles 19 extend from bases 21 suitably secured to the end walls 14. Supported by at least one base 21 is an air valve 22 opening into the chamber 23 within the body 13.

The casing 11 is of course, airtight, is resilient, being of rubber and suitable flexible members, as cords, and considerably broader than deep. It comprises an outer rubber layer 25 having a plurality of relatively large strong cords or members 26 imbedded therein and impregnated with the rubber. These cords 26 extend circumferentially of the casing 11, parallel each other and are arranged preferably, close together. As the cords 26 approach the side walls 27 of the casing they may decrease slightly in cross transverse section and they are not included in the side walls 27.

Extending crosswise of the cords 26 is a plurality of smaller-diametered cords or members 28 arranged inwardly of the cords 26 and secured to the rubber layer 25 in any approved way, as by bonding with the rubber of the layer, and these cords 28 may be impregnated with the rubber, and each gradually decrease in circumference toward its ends 29 which ends extend along the side walls 27 and are secured to the fabric covering 15 as by suitable sewing, cement, rubber or the like, as at 30. This arrangement of crossed cords provides a strong, reinforced casing, but the function of the cords is not for this purpose alone, as will now be described.

A plurality of elongated, flexible, spaced-apart members or cords 12 bridge the compartment 35 within casing 11. One of the novel tires may include substantially 4000 of these cords 12, which are arranged preferably as follows: From substantially 1000 spaced apart locations over the inner face of the casing 11, inwardly of its side walls 27, are secured to the cords or members 26, a group of four of these cords 12 which may comprise two strands looped over the cords 26 as at 36, intermediate their ends, and suitably tied at the loop, then spread apart, carried across the compartment 35 to extend non-radially with respect to the axis of rotation of the tire, and secured to the fabric covering 15 in any approved way. Preferably four ends of cords 12 of different groups converge to meet at the covering 15. Since the loops, as at 36 are staggered along the cords 26, and their connections to the covering 15 also is in staggered relationship one with another, the cords 12 will not be in frictional contact one with another when straight. This non-radial slanting of the cords 12, transfers the driving and braking force from the axis of rotation to the tread and also provide for lateral stability.

Various methods may be employed in assembling the novel tire. For example, the cords 12 may be attached to the cords 26 prior to embedding the cords 26 in the rubber layer 25, the cords 26 and 28 then bonded, as stated, to the rubber layer 25, and the free ends of the cords 12 carried to the rubber impregnated fabric covering 15 and embedded therein or attached, as by knots, to the warp of the fabric covering 15. The side walls 27 may then be secured to the fabric covering as stated. It should be borne in mind that, until the tire is inflated, the cords 12 need not be taut.

The rubber layer 25 and cords 26 form a wide, flat wall surface for traction, while the side walls 27 flex easily, because of the single layer of cords therein. They carry none of the driving or braking load, and none of the side thrust, as when making turns.

Low air pressure (for example 10 lbs. per square inch) may be employed, the air being forced through the air valve 22 into the chamber 23 and through port 17 into the compartment 25 of the casing 11. Of course adjustments of air pressure to take care of varying loads is obviously necessary.

The flexible members or cords 12 are, of course, slack when the tire flattens at its ground-engaging portion and are fairly taut at other times.

Various changes may be made to the form of invention herein shown and described without departing from the spirit of the invention or scope of the claim.

I claim:

In a low-air pressure, resilient, pneumatic tire, a substantially airtight, resilient casing, including an outer wall and an inner wall, said outer wall having an outer rubber layer, a plurality of cords extending circumferentially of said casing and imbedded within said rubber layer, and a plurality of transverse cords next inwardly of said first cords, secured to said rubber layer, intermediate their ends and with their ends secured to said inner wall; a plurality of elongated, flexible, spaced-apart members within said casing, extending non-radially with respect to the axis of rotation of said tire, each member being looped intermediate its ends, over said circumferential cords and extended between adjacent transverse cords, the portions of each member, immediately inwardly of its loop being tied together, with the free portions of each member diverging from the tie toward said inner wall and being secured to said inner wall; and an air valve operatively connected with the interior of said casing.

ARTHUR E. WENSLEY.

REFERENCES CITED

The following references are of record in the file of this patent:

UNITED STATES PATENTS

| Number | Name | Date |
|---|---|---|
| 988,533 | Zverina | Apr. 4, 1911 |
| 2,073,708 | Parrish | Mar. 16, 1937 |
| 1,470,938 | Semery | Oct. 16, 1923 |
| 1,923,975 | Harlan | Aug. 22, 1933 |
| 1,396,697 | Breuer | Nov. 8, 1921 |
| 1,921,772 | Paull | Aug. 8, 1933 |
| 1,170,597 | Archer | Feb. 8, 1916 |
| 1,641,792 | Trotter | Sept. 6, 1927 |

FOREIGN PATENTS

| Number | Country | Date |
|---|---|---|
| 15,963 | Great Britain | 1913 |